United States Patent

Tsai

[11] Patent Number: 5,970,854
[45] Date of Patent: Oct. 26, 1999

[54] ROASTING JACK

[76] Inventor: Chiung-Hua Huang Tsai, No. 72, Alley 105, Lane 274, Chung-Cheng South Road, Yung-Kang Shr, Tainan Hsien, Taiwan

[21] Appl. No.: 09/259,313

[22] Filed: Mar. 1, 1999

[51] Int. Cl.[6] .............................. A47J 37/00; A47J 37/04
[52] U.S. Cl. ..................... 99/421 H; 99/419; 99/421 R
[58] Field of Search ............... 99/339, 340, 419–421 V, 99/400, 401, 444–446, 447–450, 481, 482; 126/25 R, 9 R, 41 R; 219/400, 401

[56] References Cited

U.S. PATENT DOCUMENTS

| | | | |
|---|---|---|---|
| 3,126,814 | 3/1964 | Brown | 99/421 H |
| 4,982,657 | 1/1991 | Ghenic | 99/419 X |
| 5,172,628 | 12/1992 | Pillsbury et al. | 99/421 A |
| 5,184,540 | 2/1993 | Riccio | 126/25 R |
| 5,361,686 | 11/1994 | Koopman | 99/446 X |
| 5,367,950 | 11/1994 | Sarich | 99/449 X |
| 5,421,318 | 6/1995 | Unruh et al. | 126/9 R |
| 5,485,780 | 1/1996 | Koether et al. | 219/400 X |
| 5,562,022 | 10/1996 | Schmid et al. | 99/419 X |
| 5,715,744 | 2/1998 | Coutant | 99/421 R |
| 5,799,569 | 9/1998 | Moreth | 99/446 X |
| 5,819,639 | 10/1998 | Spell | 99/419 X |
| 5,887,513 | 3/1999 | Fielding et al. | 99/421 H |

Primary Examiner—Timothy F. Simone
Attorney, Agent, or Firm—Rosenberg, Klein & Bilker

[57] ABSTRACT

A roasting jack in the present invention includes a first turning tray, a second turning tray and several spears. The first turning tray is provided with a plurality of notches in the circumference. Each notch has a catching section properly provided for the pressing hook with a fixing portion and an inserting portion formed on one end of a spear to be fixed in. The other end of the spear, i.e. spearhead, can penetrate through a hole in the second turning tray in order to be secured to the roasting jack. When the fixing portion of the pressing hook of the spear being slightly turned upward, the pressing hook will be separated from the catching section so as to make the spear be separated from the notch of the first turning tray.

1 Claim, 7 Drawing Sheets

ROASTING JACK

BACKGROUND OF THE INVENTION

1. Field of the Invention

The present invention relates to a roasting jack, which can be provided in a roasting oven or be used while barbecuing, and more particularly to a roasting jack with convenient device for a user to directly fix or take off a spear without taking off the whole roasting jack from its supporter.

2. Description of the Related Art

A conventional roasting jack is commonly used in a roasting oven, as shown in FIG. 6, the meat to be roasted must be penetrated through by at least two inserting rods 30 first, and then two ends of each inserting rod 30 are respectively inserted into two opposite holes 102, 202 respectively provided in two turning trays 10, 20 so as to make the inserting rod 30 with the meat be fixed to the roasting jack. Then, the against flange 101 and the sleeve end 201 provided on the outer sides of two turning trays 10, 20 are respectively fixed on the against base 401 and in the sleeve 404 connected with the forcing axle 403 of the motor 402 of the roasting oven 40, as shown in FIG. 7. Thus, the roasting jack with the meat will turn with the function of the motor 402 so as to make the meat be roasted equally. After the meat being done, the whole roasting jack must be dismounted from the roasting oven 40 so as for the meat to be taken out of the inserting rods 30.

However, the above-mentioned conventional roasting jack is found to be inconvenient and troublesome because the the whole roasting jack must be dismounted from the roasting oven every time when meat needs mounting on or dismounting from the roasting jack.

SUMMARY OF THE INVENTION

Therefore, the present invention is to provide a roasting jack that substantially obviates the inconvenience and trouble caused by the related conventional art.

An object of the present invention is to provide a roasting jack whose spears can be directly fixed to or dismounted from the roasting jack without taking the whole roasting jack out of a roasting oven or off a supporter.

Accordingly, a roasting jack in the present invention includes a first turning tray, a second turning tray and several spears. The first turning tray is provided with a plurality of notches in the circumference. Each notch has a catching section properly provided for the pressing hook with a fixing portion and an inserting portion formed on one end of a spear to be fixed in. The other end of the spear, i.e. spearhead, can penetrate through a hole in the second turning tray in order to be secured to the roasting jack. When the fixing portion of the pressing hook of the spear being slightly turned upward, the pressing hook will be separated from the catching section so as to make the spear be separated from the notch of the first turning tray.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
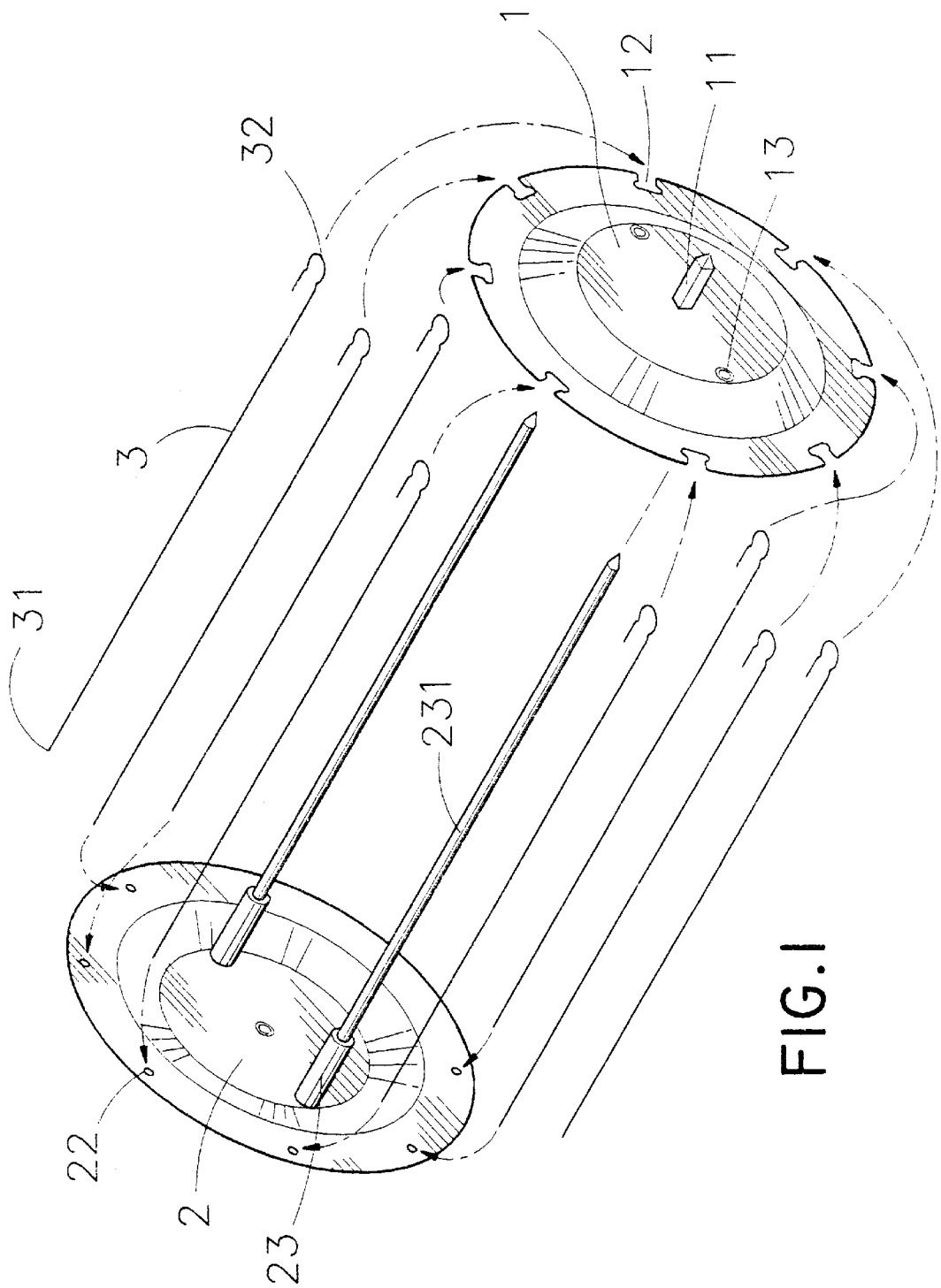
FIG. 1 is a perspective exploded view of an embodiment of the roasting jack in accordance with the the present invention.

Referring to FIG. 1, a preferred embodiment of a roasting jack in the present invention includes a first turning tray 1, a second turning tray 2 and several spears 3. The roasting jack may be provided in a roasting oven or fixed to a supporter when barbecuing.

Figure 2:
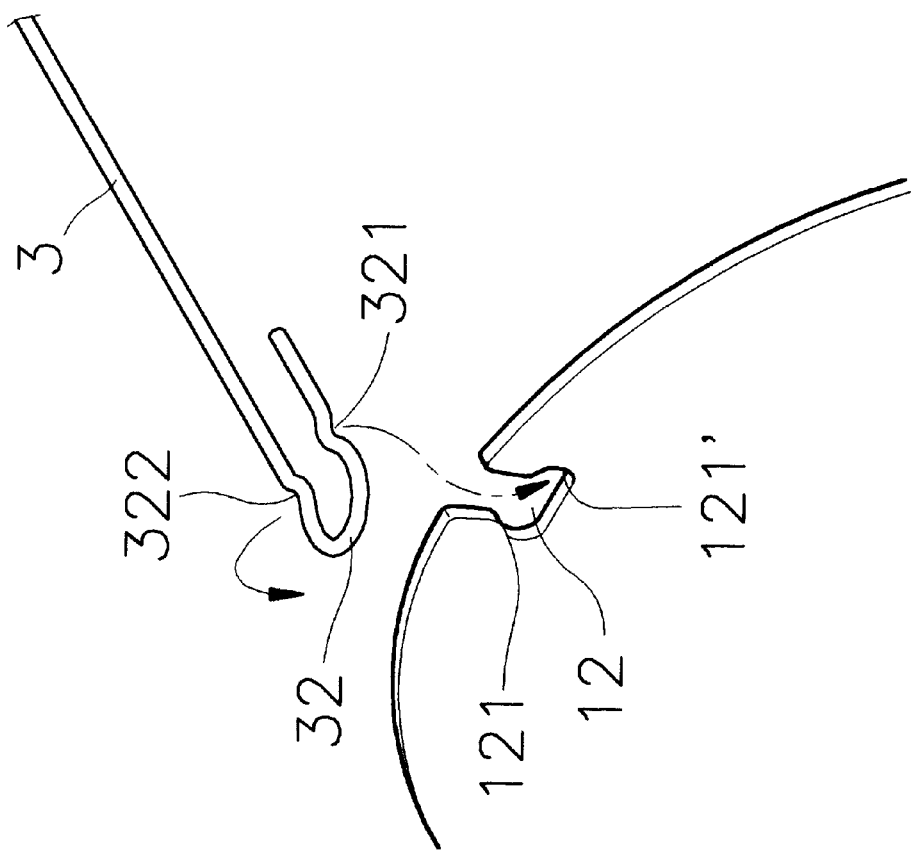
FIG. 2 is a schematic view showing the manner of the pressing hook of a spear being inserted into a notch of the first turning tray in accordance with the present invention.
Figure 3:
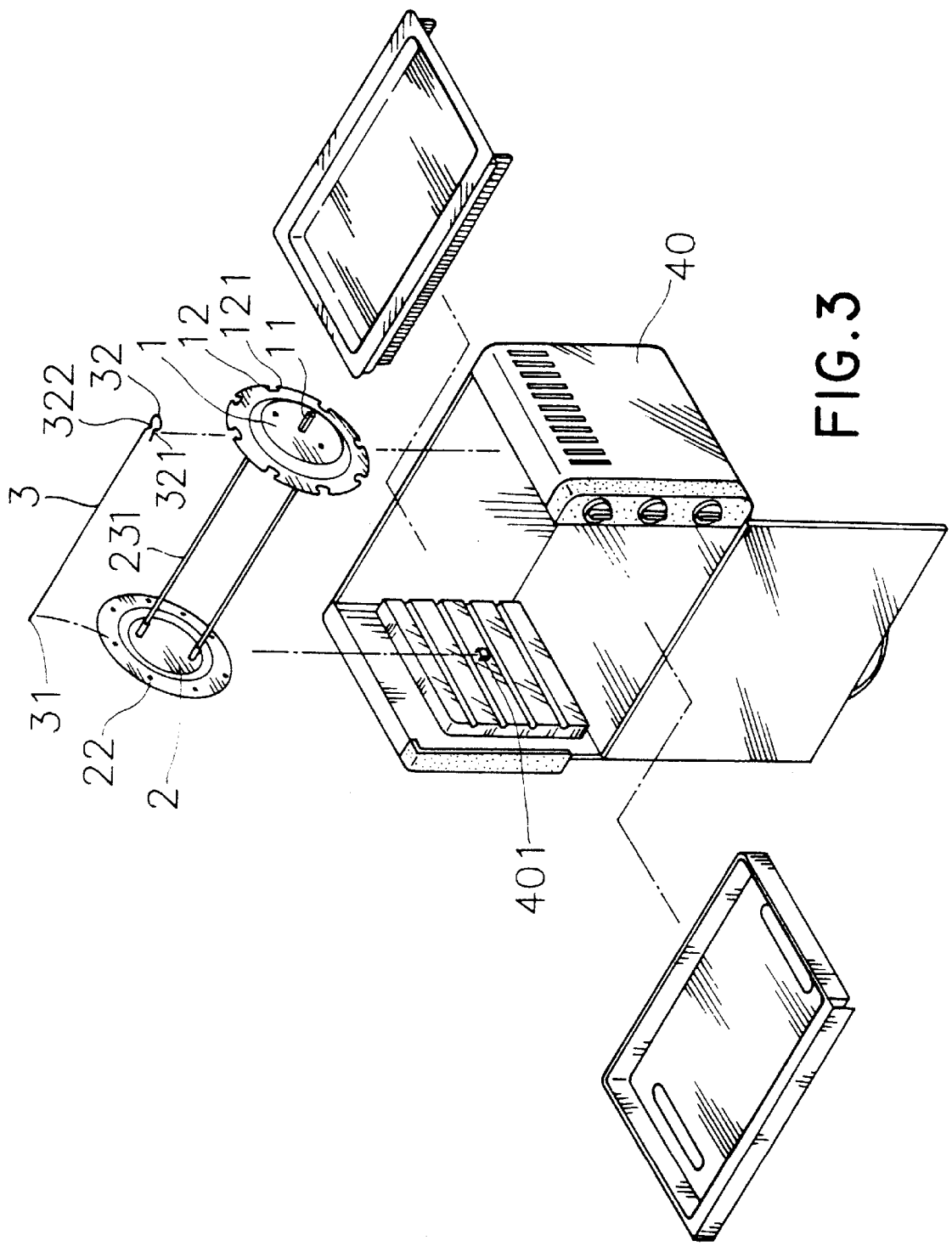
FIG. 3 is a perspective exploded view of an embodiment of the roasting jack being applied in a roasting oven in accordance with the present invention.
Figure 5:
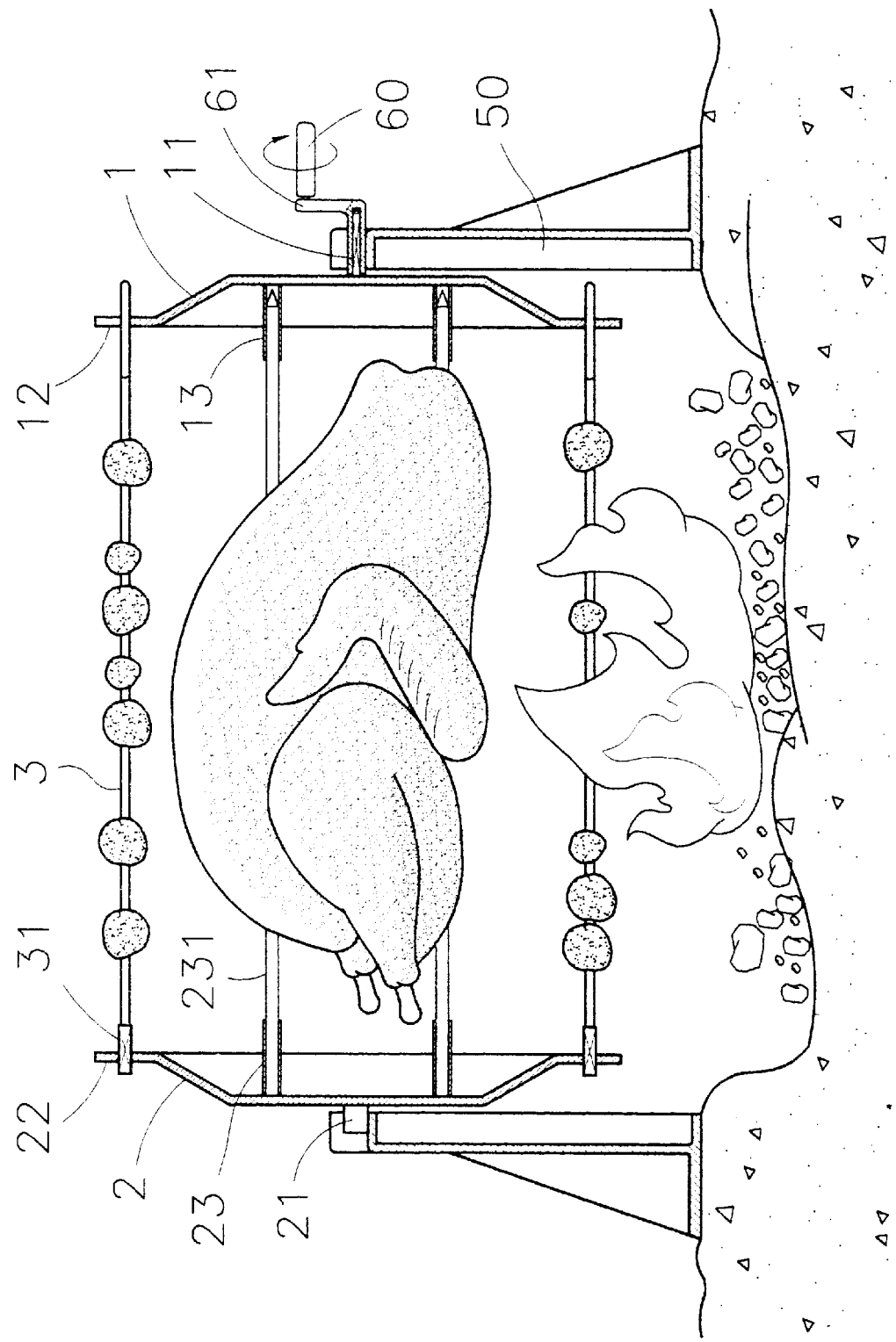
FIG. 5 is a sectional view of an embodiment of the roasting jack in an assembled configuration being applied in a fixing supporter when barbecuing in accordance with the present invention.
Figure 6:
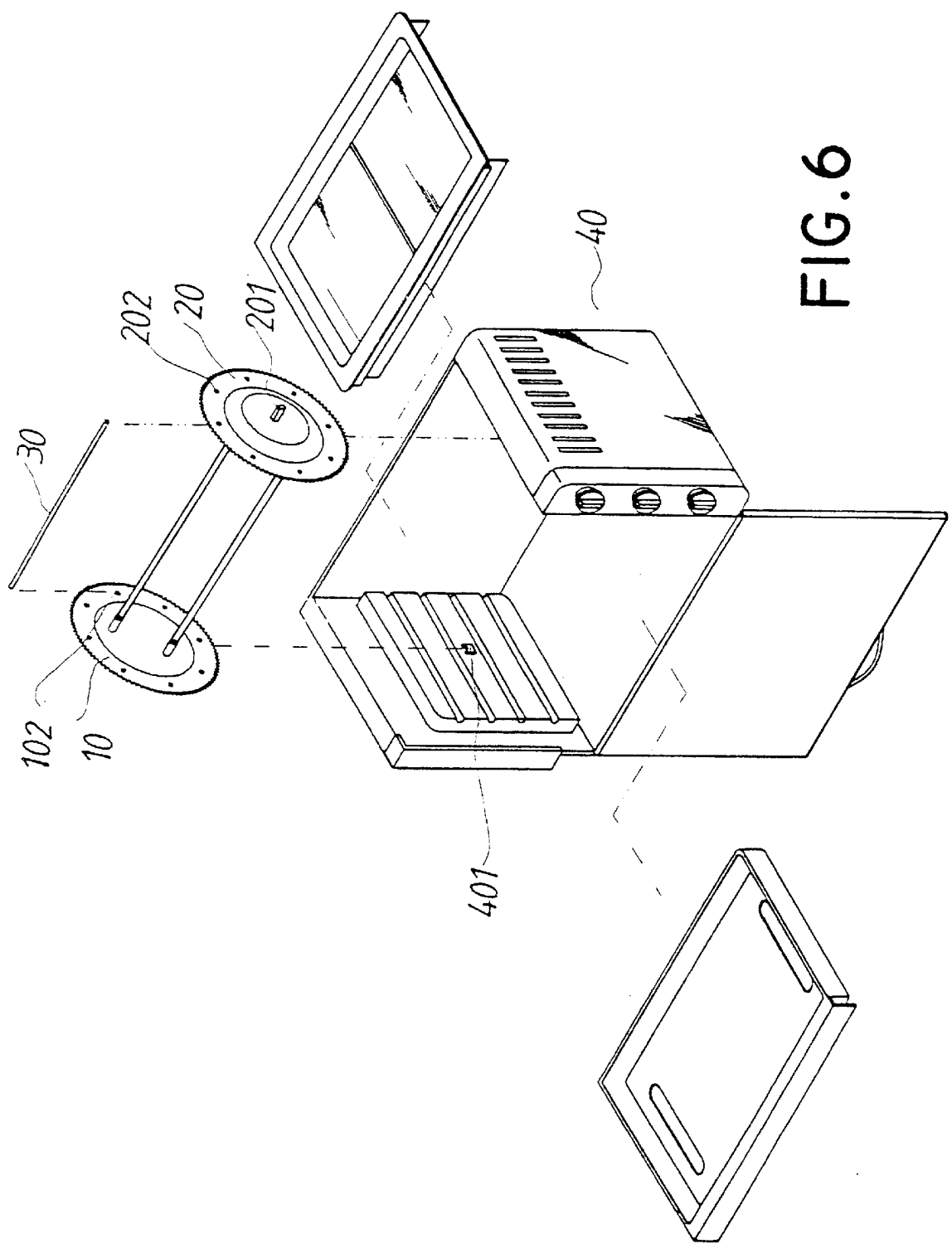
FIG. 6 is a perspective exploded view of a conventional roasting jack used in a roasting oven; and, FIG. 7 is sectional view of a conventional roasting jack in an assembled configuration being used in a roasting oven.
Figure 7:
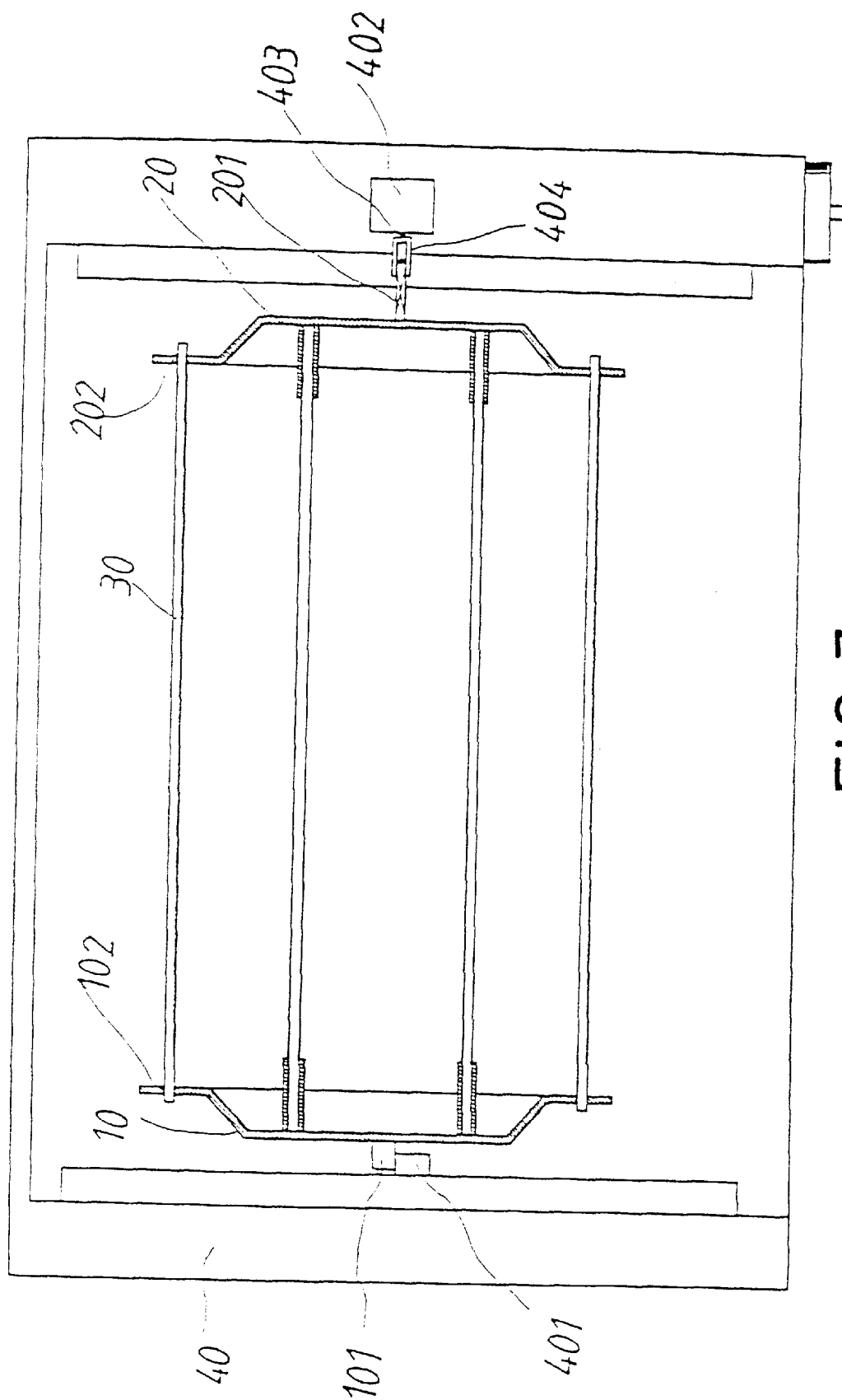

The first turning tray 1 is provided with a sleeve end 11 on the center of outer surface for the first turning tray 1 to be fixed in a roasting oven 40 by inserting the sleeve end 11 into the sleeve 404 of the roasting oven 40, as shown in FIG. 3, or to be fixed to a supporter 50 by fixing the sleeve end 11 in the swivel 61 of the handle 60 provided in the supporter 50, as shown in FIG. 5. A plurality of notches 12 are provided in the circumference of the first turning tray 1. The bottom of each notch 12 is wider than the upper opening so as to form a fixing portion 121 and a deeper catching portion 121', as shown in FIG. 2. A pair of sleeves 13 are provided on the inner side of the first turning tray 1.

The second turning tray 2 is provided with an against flange 21 protruding on the central outer side so as to make the second turning tray 2 be fixed to the against base 401 of the roasting oven 40 or on the supporter 50. In the circumference of the second turning tray 2 are provided with a plurality of round holes 22 corresponding to the notches 12 of the first turning tray 1. The round holes 22 are provided for the spearheads 31 to penetrate through. A pair of sleeves 23 are provided on the inner side of the second turning tray 2, and two thicker axles 231 are respectively with one end being fixed in the sleeves 23.

One end of each spear 3 is a spearhead 31 provided to penetrate through one of the round holes 22 of the second turning tray 2. Referring to FIG. 2, the other end of each spear 3 is provided with a pressing hook 32, and the pressing hook 32 are provided with an inserting portion 321 and a fixing portion 322. The inserting portion 321 and the fixing portion 322 can be properly fixed in the deeper catching portion 121' and the fixing portion 121 of the notch 12.

Figure 4:
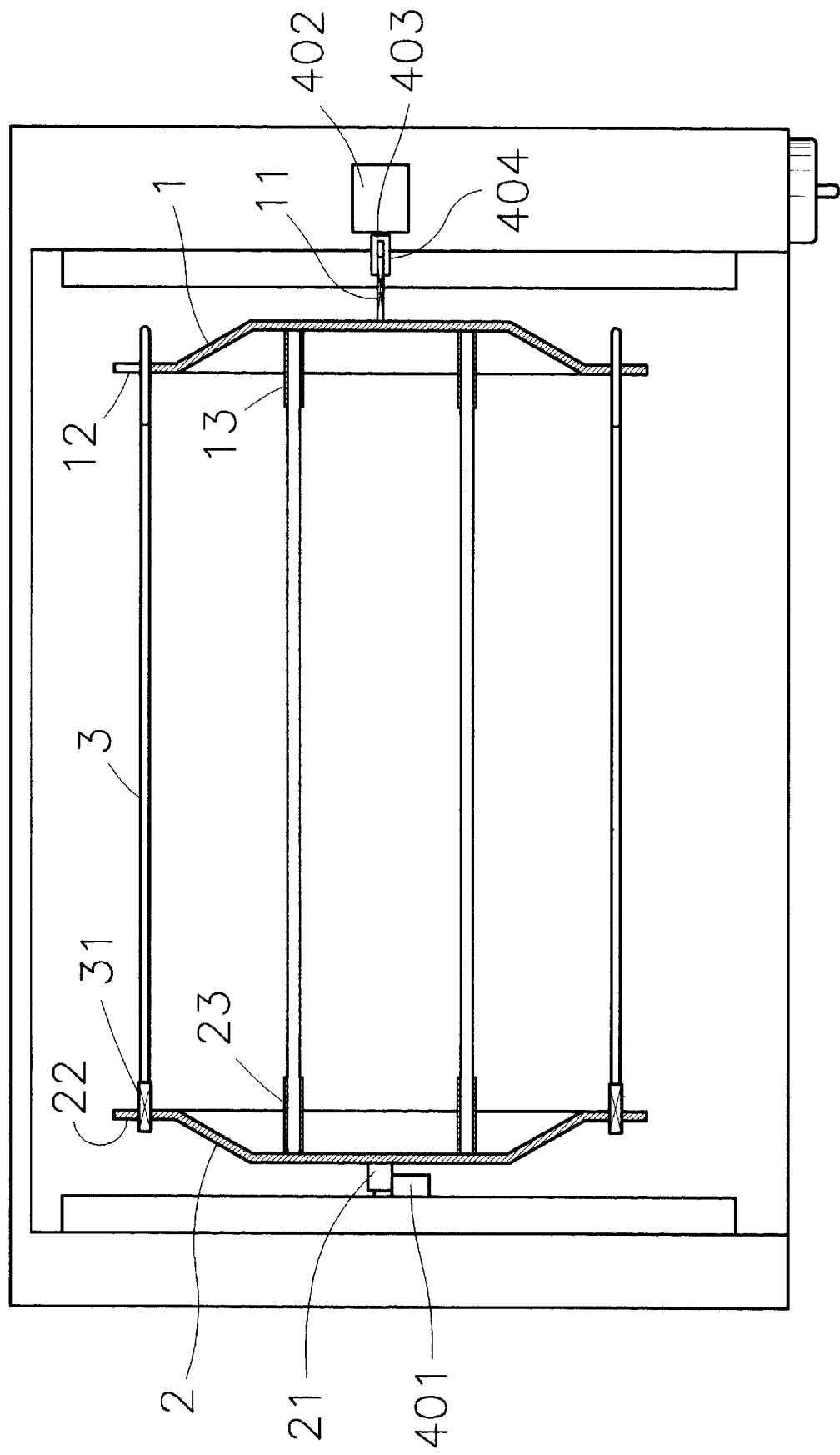
FIG. 4 is a sectional view of an embodiment of the roasting jack in an assembled configuration being applied in a roasting oven in accordance with the present invention.

In assembling, referring to FIGS. 3, 4 and 5, each thicker axle 231 with one end fixed in the sleeve 23 of the second turning tray 2 may penetrate through bigger meat first, and then the other end of each thicker axle 231 is inserted into each sleeve 13 of the first turning tray 1. After each spear 3 being mounted by smaller meat or other roasting food, each spearhead 3 1 is inserted into the round hole 22 of the second turning tray 2. The inserting portion 321 of the pressing hook 32 on other end of each spear 3 is inserted in the deeper catching portion 121' of each notch 12, and then the fixing portion 322 of the pressing hook 32 is pressed to insert in the fixing portion 121 of each notch 12 so as to make the pressing hook 32 of each spear 3 be fixed in each notch 12 of the first turning tray 1, as shown in FIG. 2.

When the assembled roasting jack in the present invention being applied in a roasting oven 40, referring to FIGS. 3 and 4, the sleeve end 11 on the outer side of the first turning tray 1 and the against flange 21 on the outer side of the second turning tray 2 are respectively provided in the sleeve 404 and on the against base 401 of the roasting oven 40. After the roasting jack being fixed in the roasting oven 40, the roasting jack will turn by the function of the motor 402 of the roasting oven 40 so as to make the meat or other roasting food be roasted equally.

When the assembled roasting jack in the present invention being applied on a supporter 50, referring to FIG. 5, the sleeve end 11 on the outer side of the first turning tray 1 is inserted into the swivel 61 of the handle 60 provided on one end of the supporter 50, and the against flange 21 on the outer side of the second turning tray 2 is provided in the hollow in the other end of the supporter 50. After the roasting jack being fixed on the supporter 50, the roasting jack will turn according to the moving of the handle 60 by manual operation so as to make the meat or other roasting food be roasted equally.

After the meat or other roasting food is done, the fixing portion 322 of the pressing hook 32 needs turning upward to separate from the fixing portion 121 of the notch 12 so as to make the pressing hook 32 be separated from the notch 12 in order for the spear 3 to be easily taken off the roasting jack and to make the meat or other roasting food be dismounted from the spear 3. Thus, it is convenient for a user to take off the spear 3 with the meat or other roasting food without taking the whole roasting jack out of the roasting oven 40 or off the supporter 50.

While the preferred embodiments of the invention have been described above, it will be recognized and understood that various modifications may be made therein and the appended claims are intended to cover all such modifications which may fall within the spirit and scope of the invention.

What is claimed is:

1. A roasting jack comprising:

a first turning tray being provided with a sleeve end on the center of outer surface for said first turning tray to be fixed in a roasting oven or to be fixed to a supporter, a plurality of notches being provided in the circumference of said first turning tray, the bottom of each notch being wider than the upper opening so as to form a fixing portion and a deeper catching portion, a pair of sleeves being provided on the inner side of said first turning tray;

a second turning tray being provided with an against flange protruding on the central outer side so as to make said second turning tray be fixed to the against base of a roasting oven or on a supporter, in the circumference of said second turning tray being provided with a plurality of round holes corresponding to said notches of said first turning tray, said round holes being provided for spearheads to penetrate through, a pair of sleeves being provided on the inner side of said second turning tray, two thicker axles being respectively with one end being fixed in said sleeves of said second turning tray; and, several spears being provided with spearheads to penetrate through said round holes of said second turning tray, the other end of each said spear being provided with a pressing hook, said pressing hook being provided with an inserting portion and a fixing portion, said inserting portion and said fixing portion able to be properly fixed in said deeper catching portion and said fixing portion of said notch, in assembling, each thicker axle with one end fixed in said sleeve of said second turning tray being able to penetrate through bigger meat first, then the other end of each thicker axle being inserted into each said sleeve of said first turning tray, after each spear being mounted by smaller meat or other roasting food, each spearhead being inserted into said round hole of said second turning tray, said inserting portion of said pressing hook on other end of each said spear being inserted in said deeper catching portion of each said notch, said fixing portion of said pressing hook is pressed to insert in said fixing portion of each said notch so as to make said pressing hook of each said spear be fixed in each said notch of said first turning tray, when said fixing portion of said pressing hook of said spear being slightly turned upward, said pressing hook being separated from said notch of said first turning tray.

* * * * *